(12) United States Patent
Miyauchi et al.

(10) Patent No.: US 6,424,433 B1
(45) Date of Patent: Jul. 23, 2002

(54) ORIGINAL READER

(75) Inventors: Yasunori Miyauchi, Unoke-machi; Minoru Masuda, Tsubata-machi, both of (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 09/242,638

(22) PCT Filed: Jun. 17, 1998

(86) PCT No.: PCT/JP99/02679

§ 371 (c)(1),
(2), (4) Date: Feb. 19, 1999

(87) PCT Pub. No.: WO98/59488

PCT Pub. Date: Dec. 30, 1998

(30) Foreign Application Priority Data

Jun. 20, 1997 (JP) ............................................. 9-163704

(51) Int. Cl.[7] ............................................... H04N 1/40
(52) U.S. Cl. ........................ 358/471; 358/482; 358/486
(58) Field of Search .......................... 382/312; 358/474, 358/475, 471, 505, 509, 476, 479, 482, 486, 491, 494, 496, 497

(56) References Cited

U.S. PATENT DOCUMENTS

| | | | |
|---|---|---|---|
| 3,678,281 A | | 7/1972 | Gleixner ..................... 250/216 |
| 4,580,172 A | | 4/1986 | Rajagopal ................... 358/293 |
| 4,747,737 A | | 5/1988 | Roffelsen ..................... 411/34 |
| 4,751,376 A | | 6/1988 | Sugiura et al. ............. 250/201 |
| 5,920,342 A | * | 7/1999 | Umeda ....................... 348/211 |
| 6,081,363 A | * | 6/2000 | Shen .......................... 359/196 |
| 2001/0012134 A1 | * | 8/2001 | Han ........................... 358/487 |

FOREIGN PATENT DOCUMENTS

| | | | |
|---|---|---|---|
| EP | 0 635 966 | 1/1995 | |
| EP | 0 717 325 | 6/1996 | ........... B03G/15/04 |
| JP | 55-93166 | 9/1953 | |
| JP | 57-155868 | 3/1956 | |
| JP | 64-2466 | * 1/1989 | ............ H04N/1/40 |
| JP | 1-279668 | 11/1989 | |
| JP | 2-21970 | 2/1990 | |
| JP | 2-155366 | 6/1990 | ............ H04N/1/12 |
| JP | 4-35455 | 2/1992 | ............ H04N/1/17 |
| JP | 4-160865 | 6/1992 | |
| JP | 6-98099 | 4/1994 | ............ H04N/1/04 |
| JP | 6-152857 | 5/1994 | |
| JP | 7-297993 | 11/1995 | |
| JP | 11-8737 | * 1/1999 | ............ H04N/1/04 |
| JP | P970021 | 12/2001 | |
| SE | 459388 | 6/1989 | ........... A47B/96/07 |

OTHER PUBLICATIONS

Richco, European Catalogue 1, Specialist in Manufacturing Quality Fasteners.

* cited by examiner

*Primary Examiner*—Jerome Grant, II

(57) ABSTRACT

An original reader such as an image scanner for inputting image information, provided with a optical source for illuminating an original, a lens unit (8) capable of optically changing resolution, and a solid-state image sensor substrate placed on an image forming plane (10) of the lens, wherein the lens unit (8) includes a plurality of lenses that can deal with a plurality of different resolution and one lens corresponding to a specified resolution is selectively moved into a light path. The lens unit and the solid-state image sensor substrate are independently movable in the direction of optical axis for focusing.

25 Claims, 18 Drawing Sheets

FIG. 5A
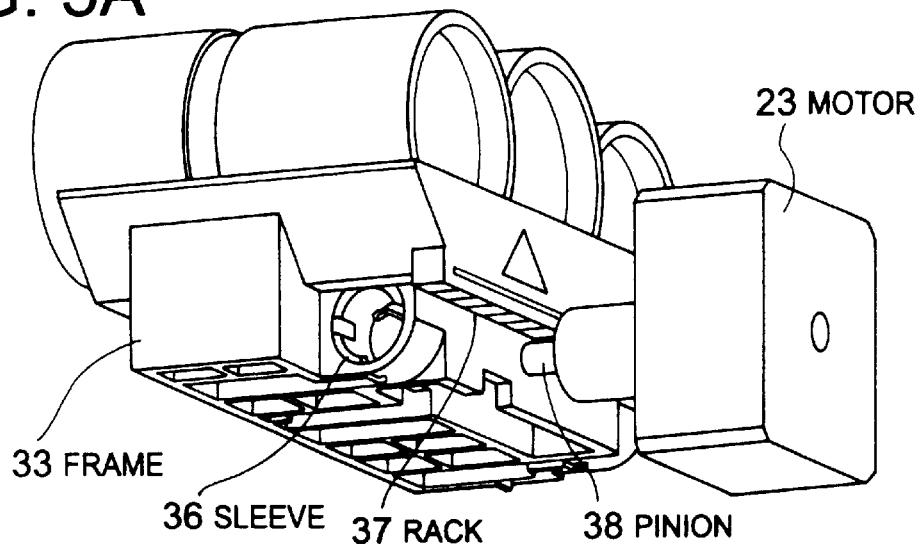
FIG. 5B
FIG. 5C
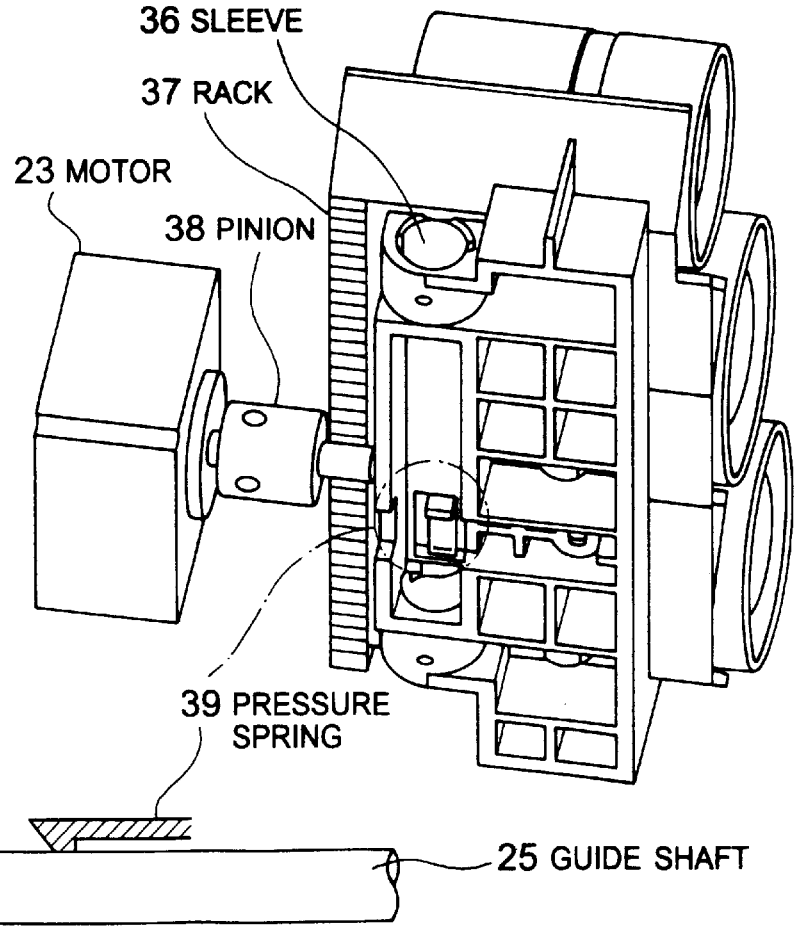

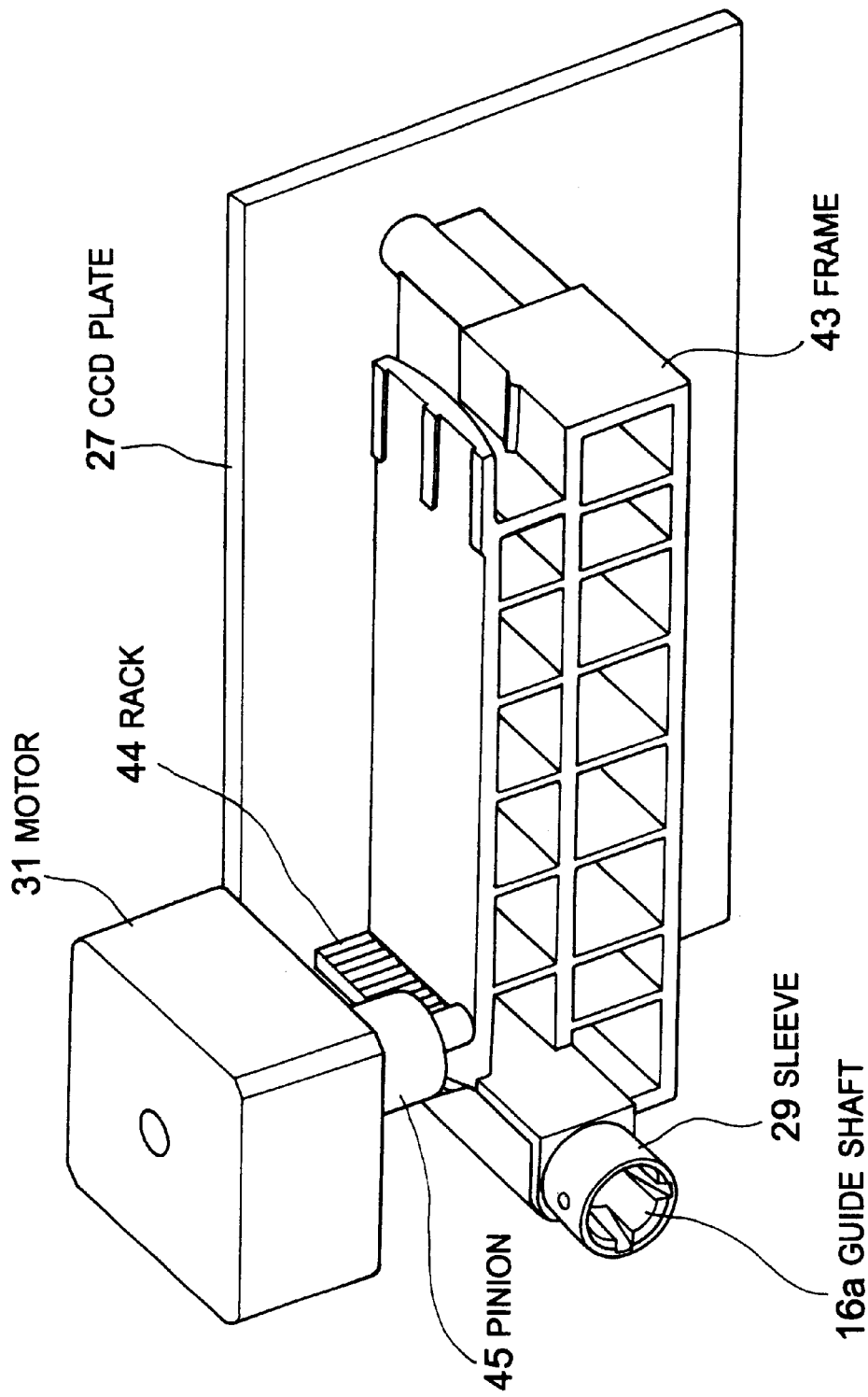

MONO FOCUS LENS SYSTEM

LENS SWITCHOVER SYSTEM

ZOOMING LENS SYSTEM

ORIGINAL READER

TECHNICAL FIELD

This invention relates to an original reader such us an image scanner that reads image information on a manuscript, and especially relates to an original reader that provides a system for changing the optical resolution thereof.

BACKGROUND ART

A prior art flatbed type of original reader is shown in FIG. 17. In FIG. 17, a transparent manuscript platform 1, a manuscript 2, a reading unit 3 movable in the direction shown by the arrow (sub-scan direction), an optical source 4, lenses 6, and CCD (solid-state image sensor) substrate 7 are shown.

A surface of the manuscript 2 placed on the manuscript platform 1 is lighted by the optical source 4 of the reading unit 3. The reflected light from the manuscript surface 2 follows a rectangular path through the mirror 5, passes through the lens 6, and reaches CCD substrate 7 to be transformed into an electrical signal. The reading resolution of the manuscript 2 depends on the focal length of lens 6. The longer the focus is, the greater the magnification and the higher the resolution, but by these technique, the image angle becomes smaller, so the main scan size becomes also smaller.

Many of the prior art original reader include a mono focus lens system in which only one lens is used, and a lens exchangeable system in which two lenses of different focus distance are used.

Additionally, in a copy machine, there is a zoom lens system that may change magnification or resolution continuously by using a zoom lens.

FIGS. 18(a),(b), and (c) show diagrams of original reader of the prior art. FIG. 18(a) shows a mono focus lens system in which an image angle is fixed by α and a main scanning range of the original reader is fixed.

FIG. 18(b) shows an example of a lens switchover system in which either a field angle of α1 of which a lens of focus length is 75 mm, or field angle of α2 of which a lens focus length is 115 mm, is able to be chosen. The resolution of 800 dpi is obtained by an angle of view of α1, and the resolution of 2400 dpi is obtained by an angle of view of α2.

FIG. 18(c) shows a zoom lens system, and that resolution is changeable continuously from 800 dpi to 2400 dpi by changing zoom ratio.

The prior art original reader of mono focus lens is impossible to change resolution optically, and when resolution changing is necessary, there is no means other than an interpolating process for obtaining high resolution, and there are problems in its image quality.

And the prior original reader having a lens switchover system provides lenses grouped in one unit, but the lens unit is movable in only one direction, such as a rectangular direction, of the optical axis for changing the lenses. On the other hand, as shown FIG. 18(b), lenses of which the focus length are different are inserted at different positions on optical axis. Additionally, lenses which are not used are evacuated so as not to obstruct the optical angle of the lens being used. Therefore, there is a problem in that the lens unit needs a large amount of space, results in a greater device size. Further because the lens unit provides only a moving means for changing the lens, a high resolution lens of depth of field and depth of focus are sensible to environmental conditions like floating of the manuscript and temperature.

Also in the case of the zoom lens system, it is a very high cost to prepare lenses which have high resolution and few aberrations.

An object of the present invention is to realize original reader including a wide range of resolution, low cost, high accuracy, and compact size.

DISCLOSURE OF INVENTION

The present invention comprises the following items as components thereof.

(1) An original reader providing an optical source for lighting the manuscript, a lens focusing an image from the manuscript image, a solid-state image sensor substrate placed on one image projected plane; the original reader further comprises a lens unit including a plurality of lenses corresponding to plural resolution, and a means for moving a lens corresponding to an indicated resolution on the optical axis.

(2) An original reader according to item (1) further comprises a means for moving the lens unit and the solid-state sensor substrate in a direction along the optical axis independently.

(3) An original reader according to item (2) in which the lens unit and the solid-state image sensor substrate are provided in a unit.

(4) An original reader according to item (3) in which the plurality of lenses of the lens unit are arranged in a direction rectangular the optical axis and optical axis and optical axis thereof are parallel to the optical axis.

(5) An original reader according to item (4) in which the optical axes of the plural lenses in the lens unit are each parallel to the optical axis and each lens is set so that optical angle of each lens is not narrowed by an adjacent lens tube.

(6) An original reader according to item (4) or (5) in which the lens unit comprises a frame having plural V grooves of cross section for mounting each lens tube.

(7) An original reader according to item (2) in which the lens unit and the solid-state image sensor substrate are attached to a guide shaft parallel to optical axis.

(8) An original reader of item (7) comprises a means for arranging an angle of the solid-state image sensor substrate to the optical axis.

(9) An original reader according to the item (8) in which the means for arranging the angle of the solid-state image sensor substrate to the optical axis includes means inclining and fixing the solid-state image sensor substrate on a guide shaft having the lens unit.

(10) An original reader according to item (9) comprises a first moving control means for moving the optical unit in a direction parallel to the optical axis, and a second moving control means for moving the optical unit in direction rectangular to the optical axis, and a third moving control means for moving the solid-state image sensor substrate in a direction parallel to the optical axis, and each of the first control means, the second control means, and the third control means are implemented by motor and rack and pinion system.

(11) An original reader according to item (10) in which each of the optical unit, the lens unit and the solid-state image sensor substrate includes means for the vibration suppressing means.

(12) An original reader according to item (11) in which the vibration suppressing means is a pressing matter to press elastically the guide shaft or guide rail.

(13) An original reader according to item (12) in which the pressing matter is formed in one body with the frame.

(14) An original reader according to item (1) in which the optical source and the solid-state image sensor substrate are set within a reading unit, and the optical path in the reading unit is shut from a manuscript.

(15) An original reader according to item (1) comprises a manuscript reading control part, and the manuscript reading control part comprises resolution directing means for indicating the resolution by block unit in a direction to sub scanning over manuscript reading range, and resolution switchover method for changing resolution indicated at block border during manuscript reading action.

(16) An original reader according to item (15) in which the resolution changing control means of the manuscript reading control part moves a corresponding lens in the lens unit along the optical axis according to the specified resolution of the next block when the sub-scan unit reaches a boundary of the block on the manuscript reading range and controls the lens unit and the solid-state sensor substrate to the best position in a direction parallel to the optical axis.

BRIEF DESCRIPTION OF DRAWINGS

FIG. 5 shows a transparent drawing of a driving unit of the lens unit.

FIG. 8 shows an explanation drawing of an optical unit for a CCD substrate.

BEST MODE FOR CARRYING OUT THE INVENTION

Figure 1:
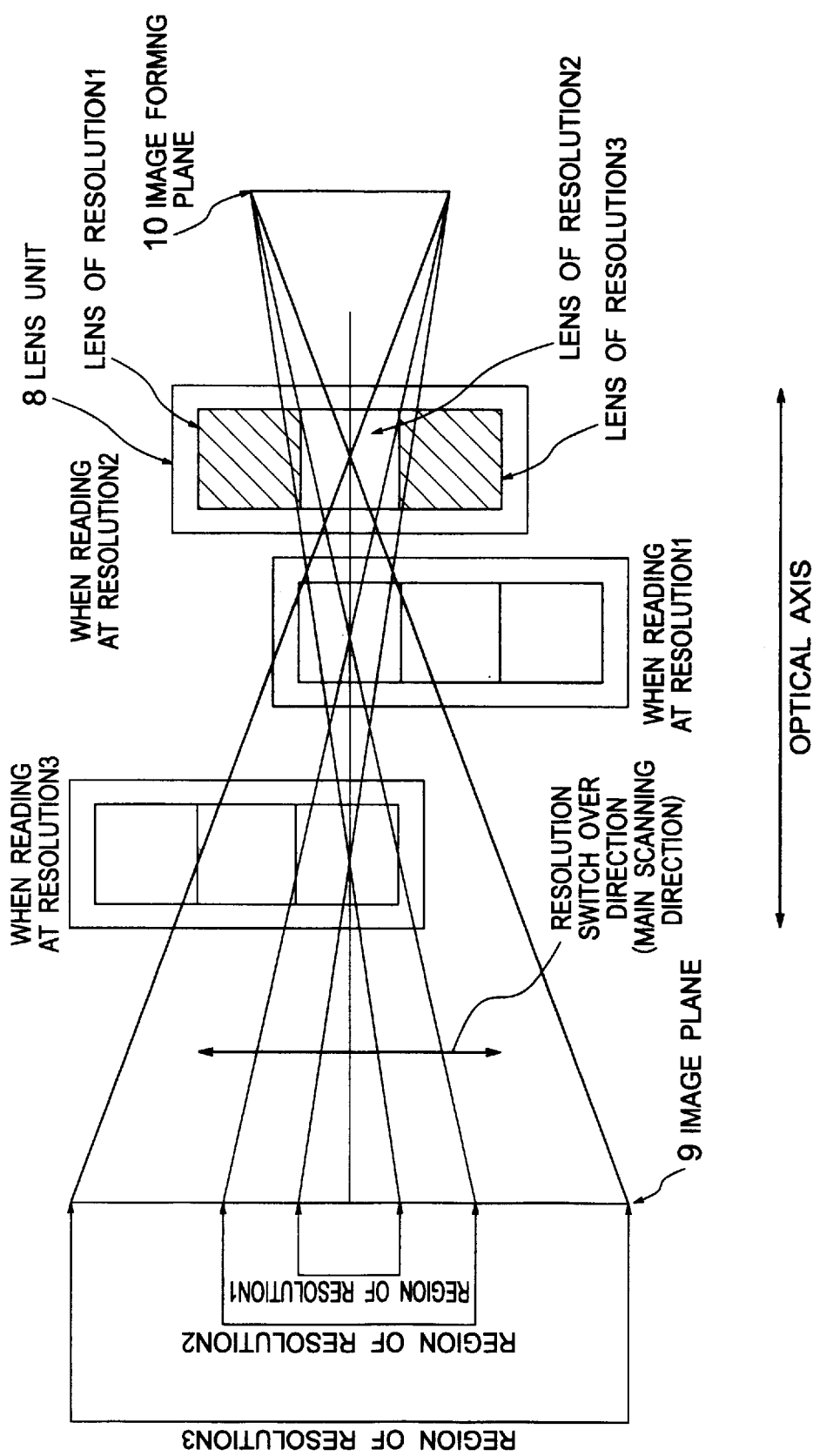
FIG. 1 shows an explanation drawing of principle of the present invention.

Referring to the drawings, the present invention is explained in detail.

FIG. 1 shows a principle of the present invention. In FIG. 1, 8 is a lens unit, 9 is an image plane, 10 is an image forming plane. The lens unit 8 shown in FIG. 1 includes three kinds of lenses corresponding to resolution level 1, resolution level 2 and resolution level 3, and they are housed upper and below in direction relative to the drawing. The level order of resolution of the lenses is resolution 3≧resolution 1≧resolution 2.

The lens unit 8 moves up or down to be inserted into the path of the optical axis, and moves right and left in the optical direction so that an image of the image plane is formed exactly on the image forming plane. In this way, when reading by resolution 2, lens unit 8 is placed at the most right side so that lens of center position is inserted into the path of the optical axes. Or when reading by resolution 3, the lens unit 8 is positioned to the most left side so that the lower position lens is inserted into the axis of the optical axis. And when reading at resolution 1, the lens unit 8 is positioned at middle position so that the most upper positioned lens is inserted into the path of the optical axis. Like these, the lenses are changed corresponding to each resolution and the optimized position for focusing at the optical axis is set and the optical angle corresponding to the resolution is obtained.

Further, but not shown in the drawing, a CCD substrate placed on the image forming plane 10 is movable in a direction of the axis, and magnifying and focusing are controlled exactly by changing the optical length from the manuscript plane or lens to the CCD substrate.

Figure 2A:
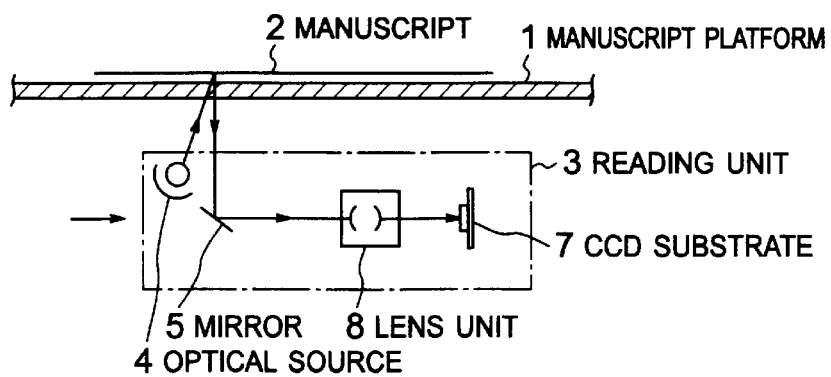
FIGS. 2(a), (b) and (c) show explanation drawings of an embodiment of the present invention.

FIGS. 2(a), (b) and (c) show typical embodiments of an original reader of the present invention.

FIG. 2(a) shows a case of flat type original reader for reading manuscript. In FIG. 2(a), 1 (reference number 1) is manuscript platform, 2 is manuscript set on the manuscript platform, 3 is reading unit, 4 is optical source, and 5 is mirror, 7 is CCD substrate, 8 is lens unit. The reading unit 3 moves in the direction shown by the arrow in time of action to sub-scan the manuscript 2. The lower surface manuscript 2 is lighted by the optical source, and the reflected light from the manuscript 2 is reflected by the mirror 5, and transmits through the lens unit 8, and injected to the CCD substrate 7. The lens unit 8 is moved in a direction rectangular to the drawing according to an indicated resolution, and a corresponding lens is selected to be inserted into the path of the optical axis. At the same time the whole lens unit 8 is moved in a direction along the optical axis for focusing the lens which is inserted into the path of the optical axis.

Figure 2B:
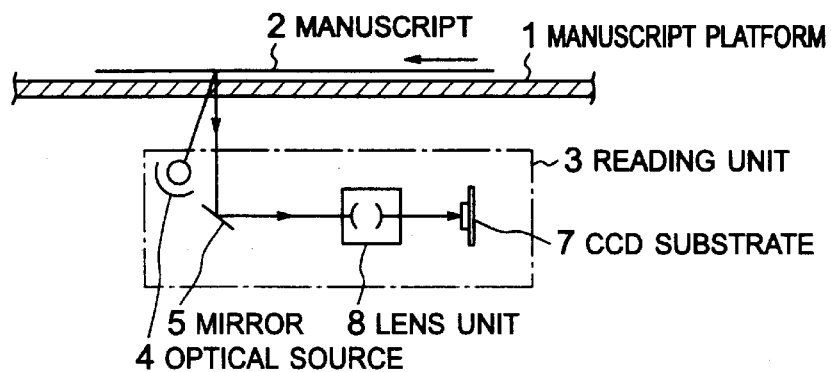

FIG. 2(b) shows an embodiment of a case of ADF type original reader which supplies and reads manuscript. The reading unit 3 of FIG. 2(b) is same with the reading unit 3 of FIG. 2(a), but the reading unit 3 of FIG. 2(b) is fixed and sub-scanned by moving manuscript 2 in the direction shown by the arrow.

Figure 2C:
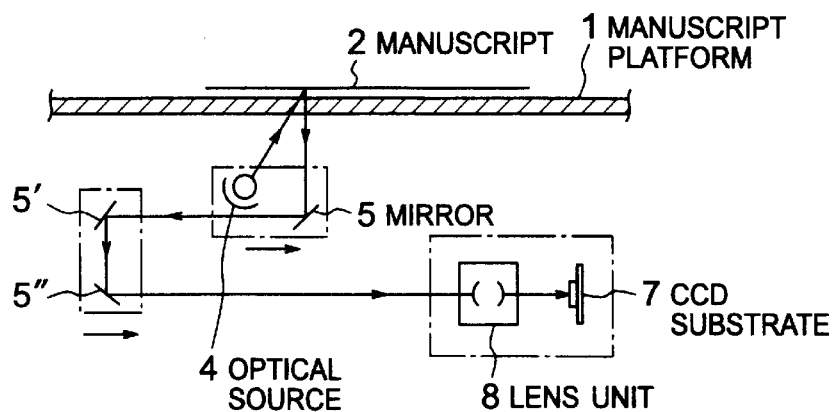

FIG. 2(c) is a case of original reader of two carriers system. The device of FIG. 2(c) is that the lens unit 8 and CCD substrate 7 is fixed for sub-scanning and sub-scan by optical source 4 and mirror 5 as one carrier and by mirror 5' and 5" as another carrier. In this case, two carriers moving is controlled so that the optical length from subscan position of manuscript to a fixed optical unit 8 and CCD substrate 7 is constant for sub-scan.

Figure 3A:
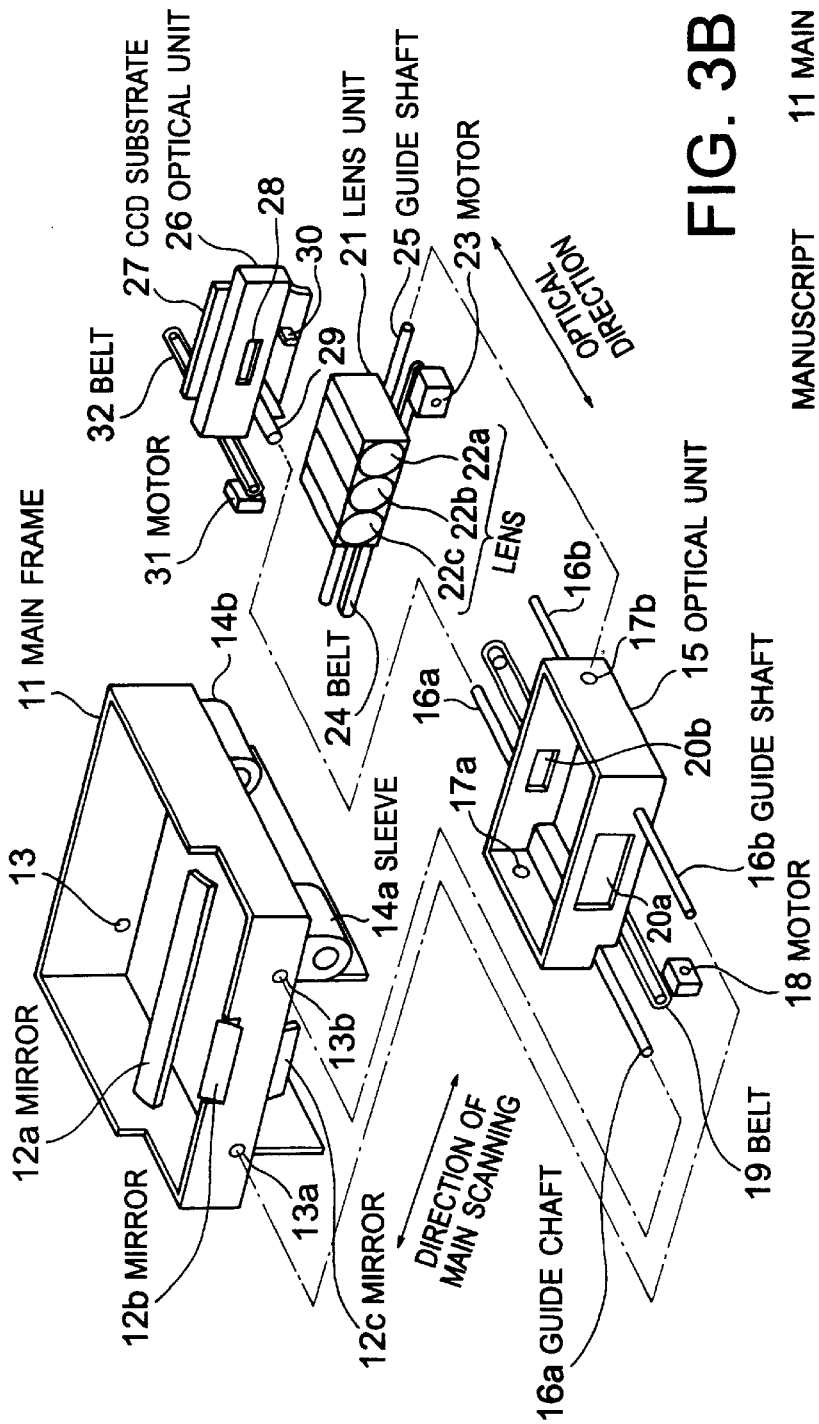
FIG. 3 shows an explanation drawing of an embodiment of a reading unit.
Figure 3B:
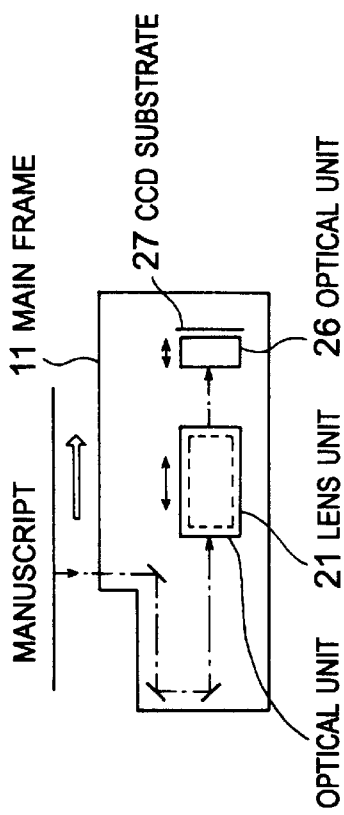

FIG. 3 shows an embodiment of reading unit 3 of original reader of FIG. 2(a), and FIG. 3(a) is a development drawing FIG. 3(b) is an outline cross sectional view.

In FIG. 3(a), optical unit 15 and optical unit 26 are mounted on the main frame 11 of the reading unit. The lens unit 21 is mounted on the optical unit 15, and CCD substrate 27 is mounted on the optical unit 26.

The main frame 11 comprises mirror 12a, 12b, 12c for changing the optical rout, and hole 13a~13d for keeping the guide shafts 16a and 16b of optical unit 15, and guide sleeve 14a~14b for guiding reading unit when moving the reading unit by sub-scan.

The optical unit 15 comprises guide shaft 16a, 16b, and hole 17a, 17b for keeping the guide shaft 25 of lens unit 21, and motor 18 and belt 19 for moving the main frame back and forth in the main frame 11, and window 20a, 20b for injecting and projecting light for lens of lens unit 21.

The lens unit 21 comprises three lenses 22a, 22b, 22c, motor 23 and belt 24 for moving in a direction rectangular to the optical length, and guide shafts.

The optical unit 26 comprises CCD substrate 27 attached to the back side therein, and window 28 attached to the opposite window 20b thereto and the optical injecting window 28, guide sleeve 29 and guide rail 30, motor 31 and belt 32 for moving back and forth the optical unit.

FIG. 3(b) shows a cross sectional view that the optical unit 15, lens unit 21, optical unit 26, and CCD substrate 27 are mounted on the main frame.

Figure 4A:
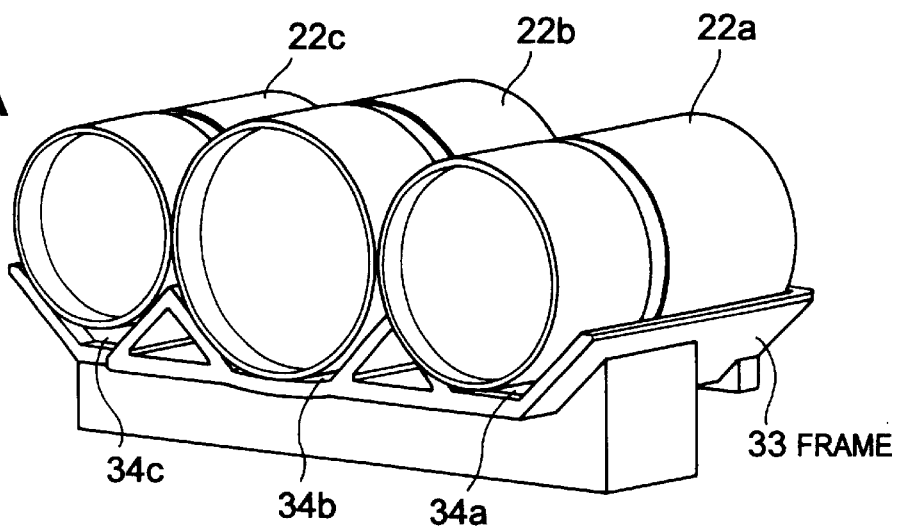
FIG. 4 shows a transparent drawing of a lens unit.
Figure 4B:
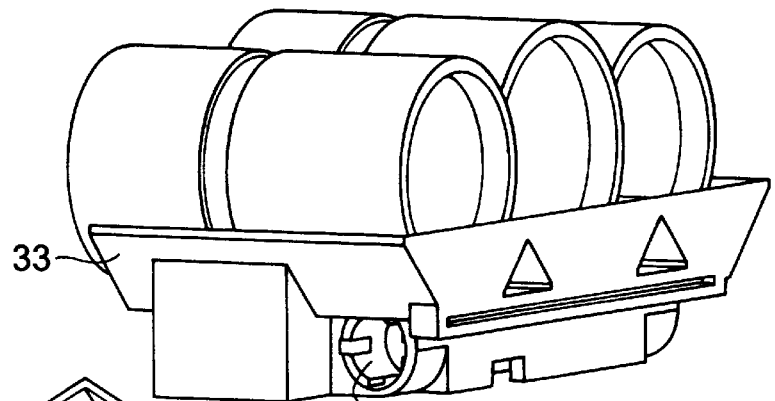
Figure 4C:
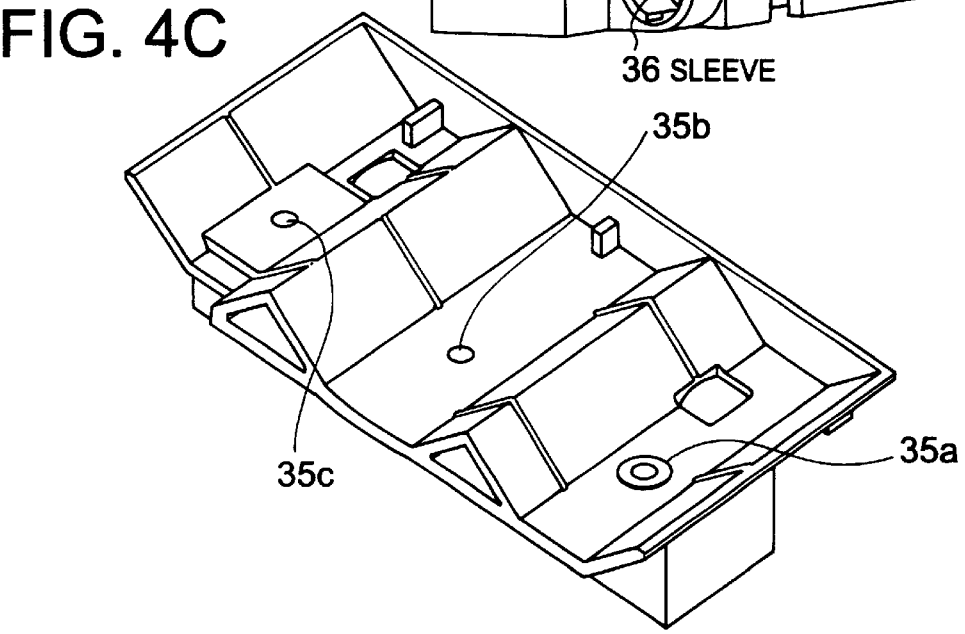

FIG. 4 shows an example of lens unit. FIG. 4(a) shows a oblique sectional view from upper oblique, and FIG. 4(c) shows an oblique sectional view of frame keeping lens from oblique.

In FIG. 4(a), three lenses of which resolution are different one another are mounted in a line on the frame 33. V shaped groove 35a,35b and 35c are formed at the frame 33, and lens 22, 22b, 22c are kept by both sides of the V shaped groove. As shown in FIG. 4(c), hole 35a, 35b and 35c are formed on the bottom of the frame 33, and each lens is strongly fixed by screw through the holes from the back side. By the way, exactitude of attachment height of lenses are guaranteed, so lowering resolution of lens by inclination thereof and image curving are prevented and control for regulating up optical axis is not necessary. Frame 33 has sleeve 36 which keeps the slide guide shaft 25 of FIG. 3.

FIG. 5 shows an embodiment of driving mechanism for moving lens unit. FIG. 4(a) shows an oblique sectional view from upper oblique point, and FIG. 4(b) shows an oblique sectional view from lower oblique point. In the embodiment, rack pinion mechanism is used instead of the belt 24 of FIG. 3. The rack 37 is attached to a part of the back surface of the bottom of the frame 33, and the rack and the pinion connected to a motor 23 and the lens unit is implemented to move. Parts number of rack pinion system is less than belt system, and adjustment of belt tension is not necessary, therefore making up, adjustment and maintenance are easy and cost is reduced.

A pressure spring 39 hooking the guide shaft 25 is attached to the bottom of frame 33 for preventing vibration thereof caused play of the sleeve 36 and guide shaft 25 (see FIG. 4).The pressure spring is formed in one body with the frame 33.

Figure 6A:
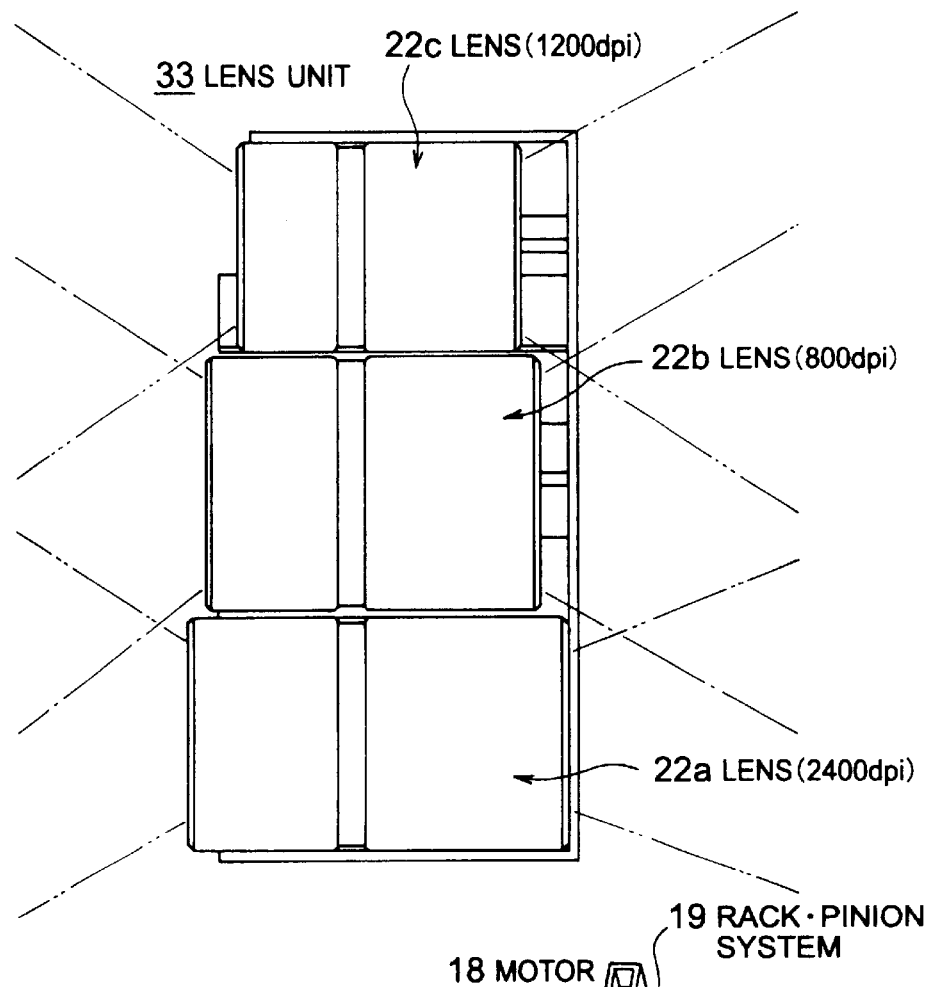
FIG. 6 shows an explanation drawing of an embodiment of lens placement in the lens unit.
Figure 6B:
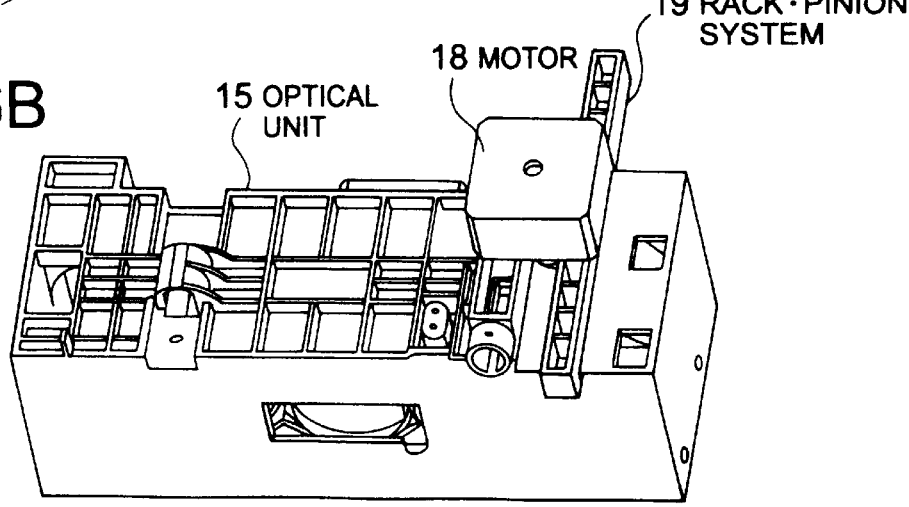

The placement of each lens in the lens unit should be placed to be compact. For this reason, each pitch between the lenses should be the less under condition that each lens pipe is outside of image angle of adjacent lens. FIG. 6(a) is embodiment of lens unit that is placed at the best position for avoiding interference between lenses in considering the length of lens pipe and lens diameter in case of lens 22a, 22b and 22c each corresponding to 2400 dpi, 800 dpi and 1200 dpi. FIG. 6(b) shows an embodiment of optical unit 15 (see FIG. 3) on which lens unit shown in FIG. 6(a).In the embodiment, rack pinion mechanism 19a is used instead of belt 19 of FIG. 3 as a means for moving the optical unit 15 in a direction along the optical axis.

Figure 7A:
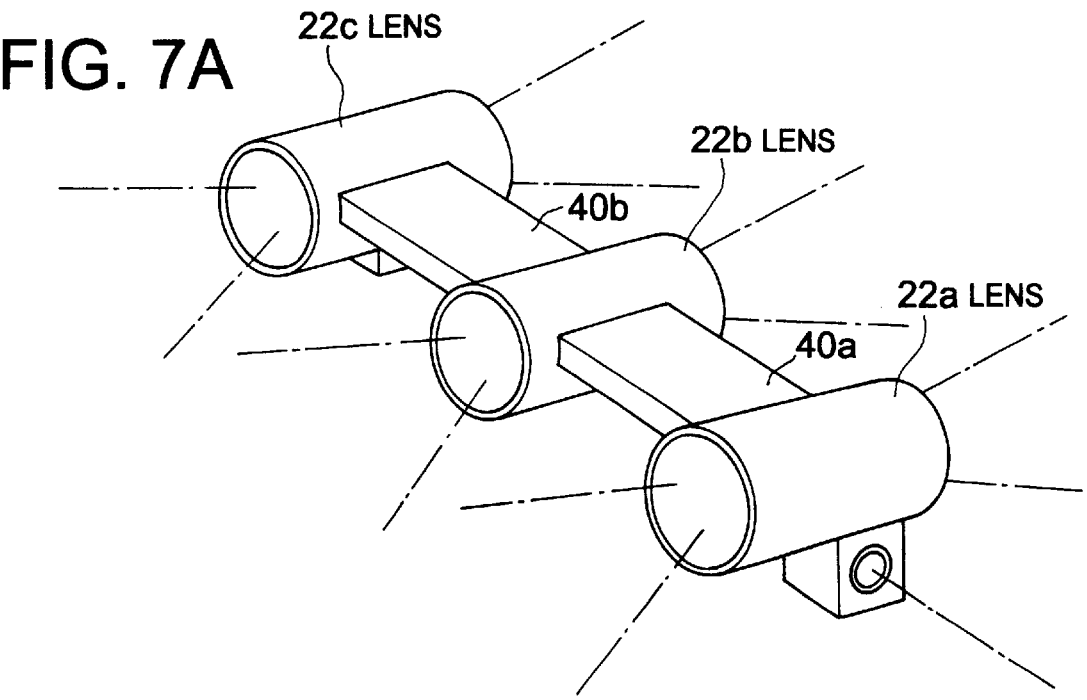
FIG. 7 shows an explanation drawing of another embodiment of the lens unit.
Figure 7B:
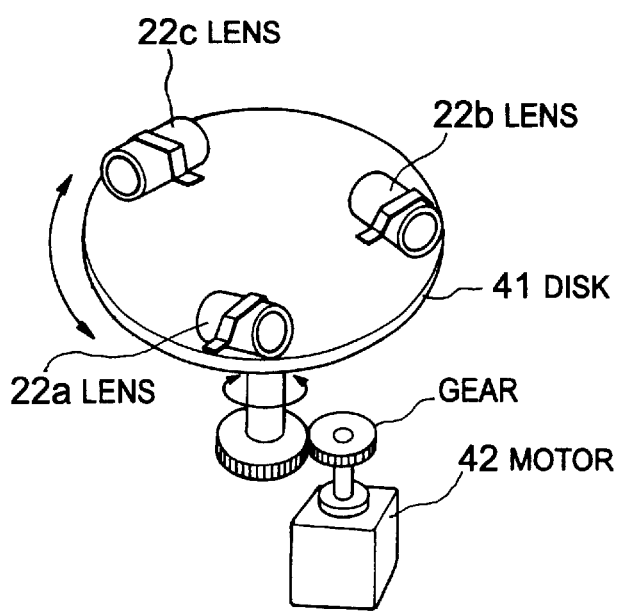

FIG. 7 shows another embodiment of lens unit and FIG. 7(a) shows an example of lens unit, in case necessary for enough great pitch between the lenses, and each lens is connected with substrate 40a,40b of necessary length. Lens is changed by moving the unit in a direction along the lens connections. FIG. 7(b) shows an embodiment that each lenses is attached separately on a circular substrate 41, and the circular substrate 41 is rotated by driving motor to change the lenses.

FIG. 8 shows an embodiment of optical unit for CCD substrate 27 in the reading unit of FIG. 3. The example of FIG. 8 is a rack and pinion being used as the means for moving moves back and forth the optical unit 26 in stead of the belt 32 of FIG. 3. In FIG. 8, the rack 44 mounted on the frame 43 contacted with the pinion is implemented by the motor 43 to move the CCD substrate 27 fixed to the frame 43 back and forth.

Figure 9A:
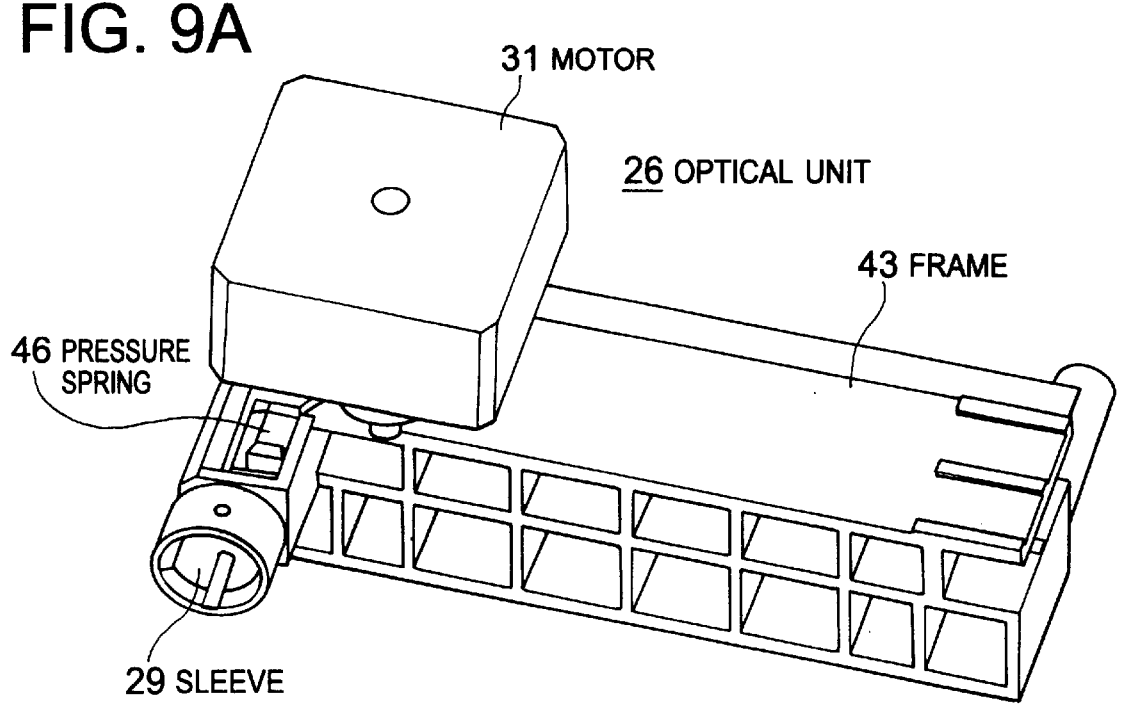
FIG. 9 shows an explanation drawing of a unit of pressing spring in an optical unit.
Figure 9B:
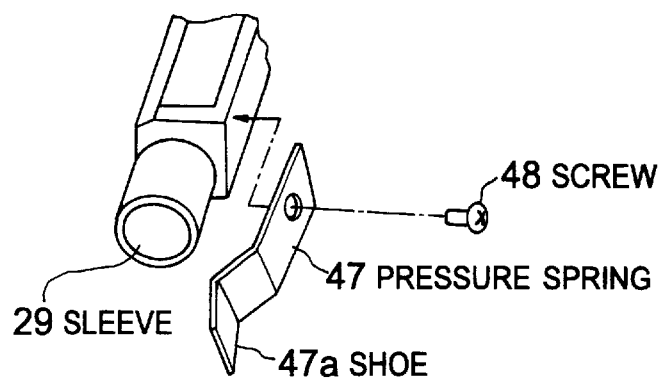

FIG. 9(a) is that a pressure spring 46 same with the pressure spring 39 of FIG. 5 being mounted on back to the sleeve 29 for preventing the optical unit vibrating, and the pressure spring 39 is formed to frame 43 as one body forming with resin. FIG. 9(b) shows the other example that fixed a pressure spring 47 made by springy metal fixed back to the screw 48, and a shoe 47a of point part of pressure spring 47 moves the guide shaft 17a inserted to the sleeve 29.

When CCD substrate 27 is not attached parallel to the manuscript surface or lens plane, resolution of main scanning direction changes, or image forming plane is curved. Therefore it is necessary that CCD substrate 27 is movable independently to left and right in a parallel direction for easily setting up and regulating thereof.

Figure 10A:
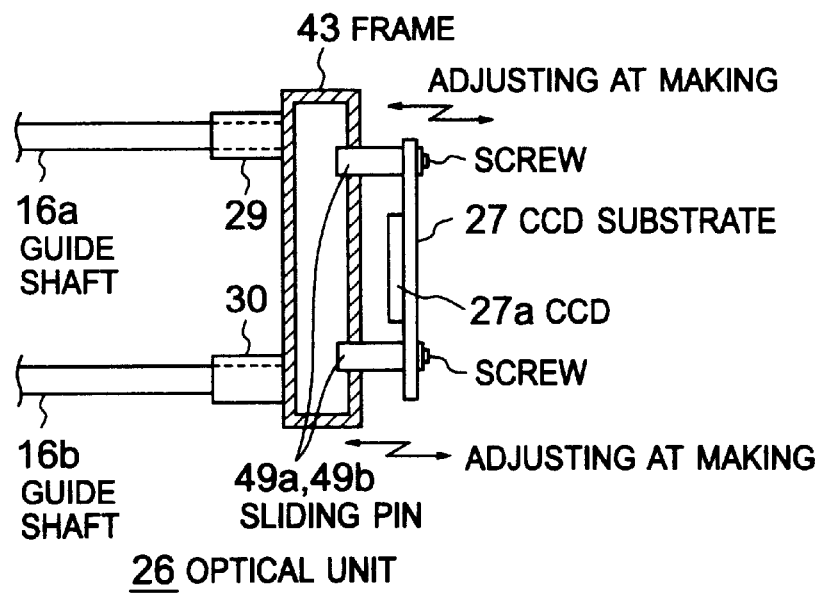
FIG. 10 shows an explanation drawing of an embodiment of a control mechanism for inclining a CCD substrate

FIG. 10(a) and (b) shows an embodiment for these.

FIG. 10(a) shows a cross sectional view of optical unit of frame 43 from upper position and CCD substrate 27 and frame 43 are connected with two slide pin of 49a and 49b. Each of the top of slide pin 49a,49b is inserted into a hole opened at frame 43 and is possible to slide right and left independently. When CCD substrate 27 is set up and regulated, insertion length of the slide pin 49a and 49b is regulated so that out put of CCD substrate 27a is uniform and it is fixed to the frame 43.

Figure 10B:
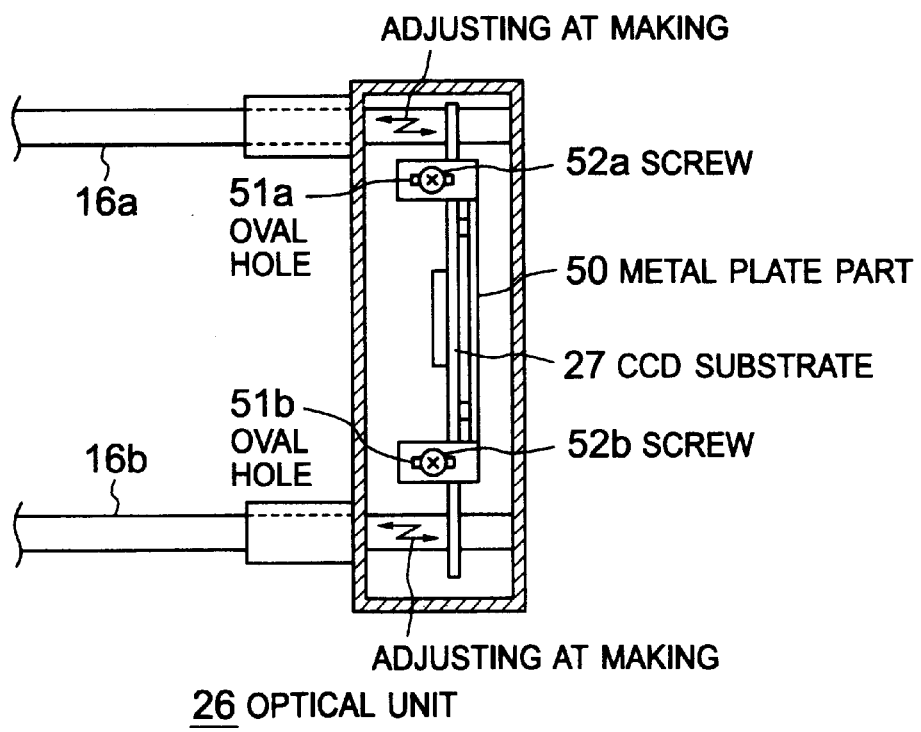

FIG. 10(b) shows another embodiment, and it is that the right and left setting hole 51a and 51b for fixing the metal plane part 50 to frame 43 are formed like an oval form, and each of right and left sides is set at the suitable position and fixed by the screw 52a and 52b to the frame 43.

Figure 11:
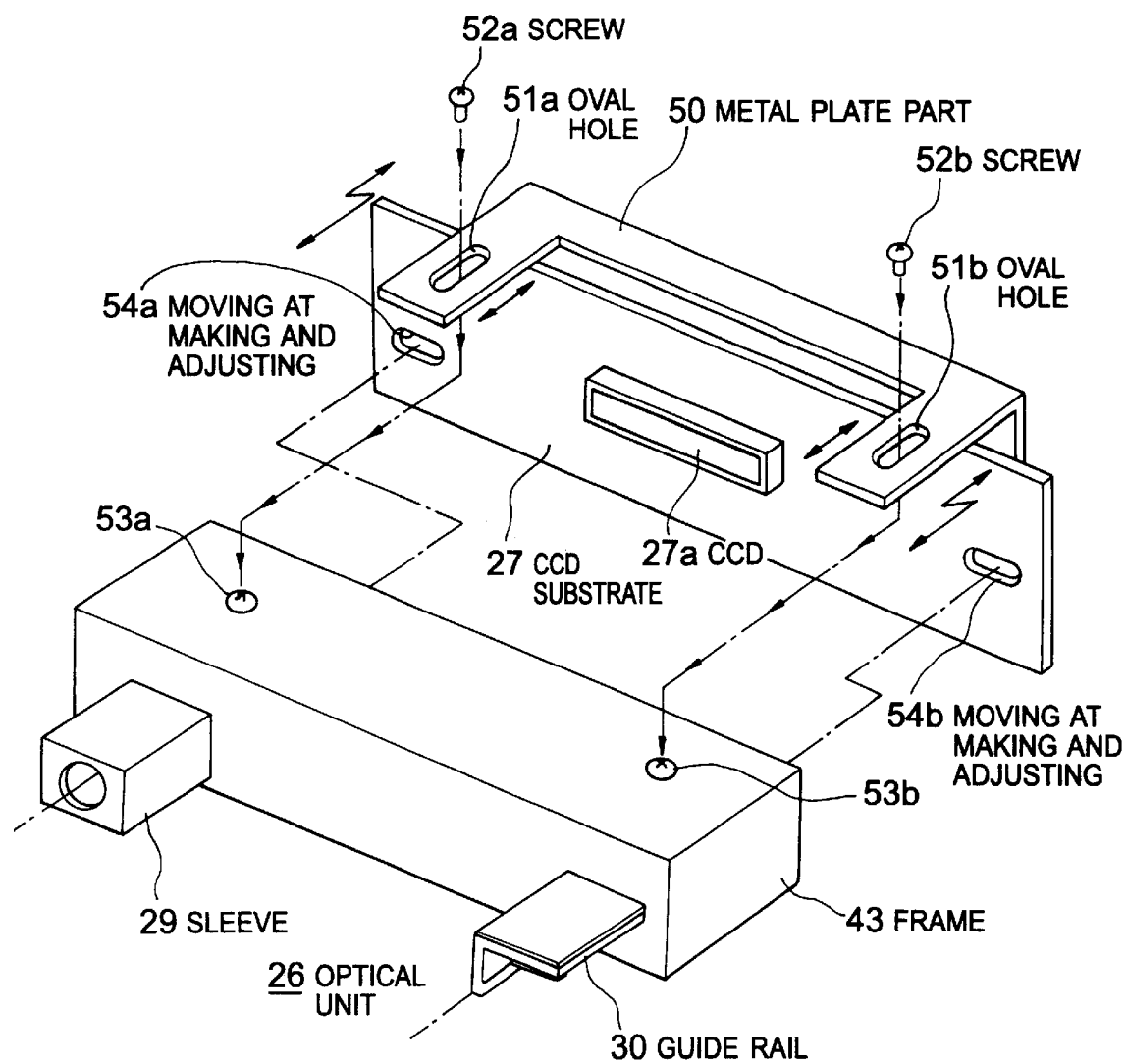
FIG. 11 shows a drawing of detailed explanation of an embodiment of a control mechanism for inclining a CCD substrate

FIG. 11 shows a detail view of FIG. 10(b). Upper part of the metal substrate 50 coupled with the CCD substrate 27 and ear shaped part are formed right and out side. Oblique hole 51a 52b are formed and fixed to the screw hole 53a,53b opened at the frame 43 each by screw 52a, 52b. Further hole 54a,55b penetrates the guide shaft 16a,16b (see FIG. 3) at right side and left side of CCD substrate 27. By this way, CCD substrate 27 is kept stable by the guide shaft 16a, 16b, and slid back and forth independently to right and left and the inclination of plane of CCD substrate 27a may be regulated with high accuracy.

Figure 12:
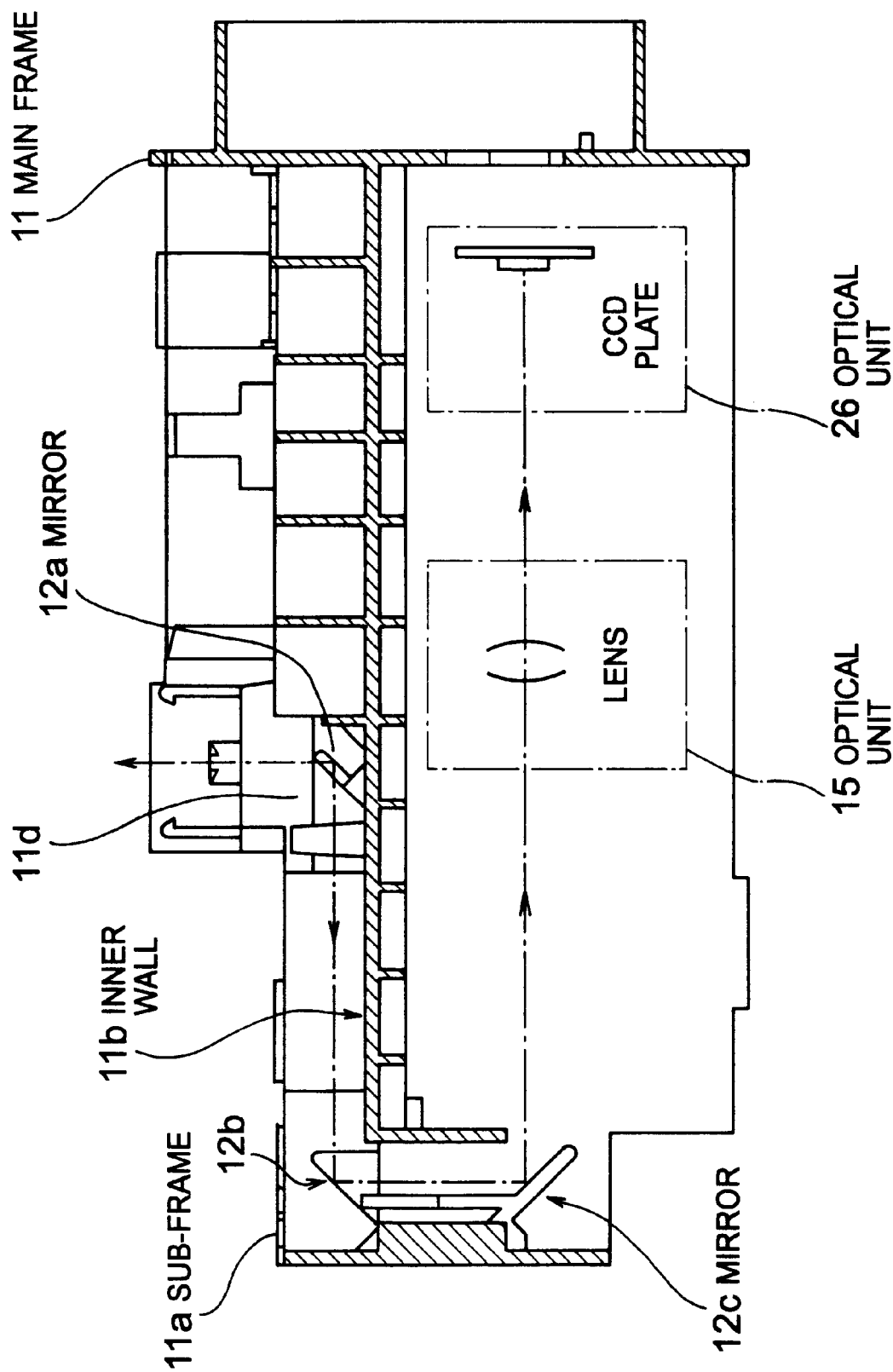
FIG. 12 shows drawing of an embodiment of a cross sectional view of a main frame.
Figure 13:
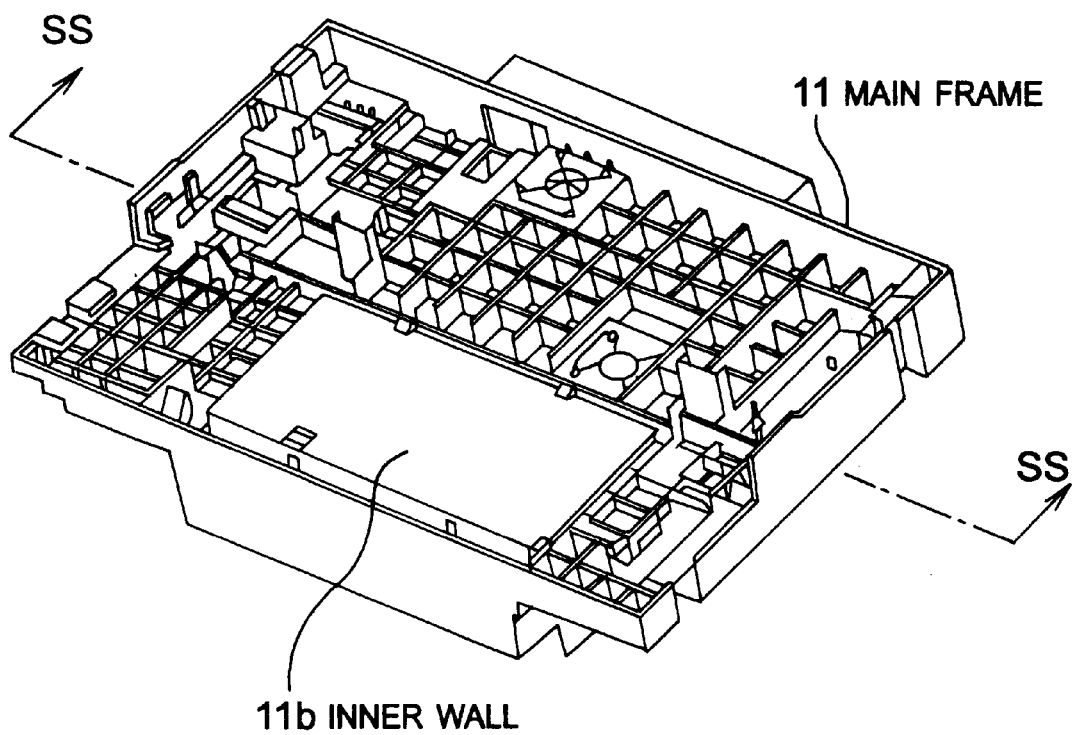
FIG. 13 shows a drawing of a transparent view exposing a part of the main frame.
Figure 14:
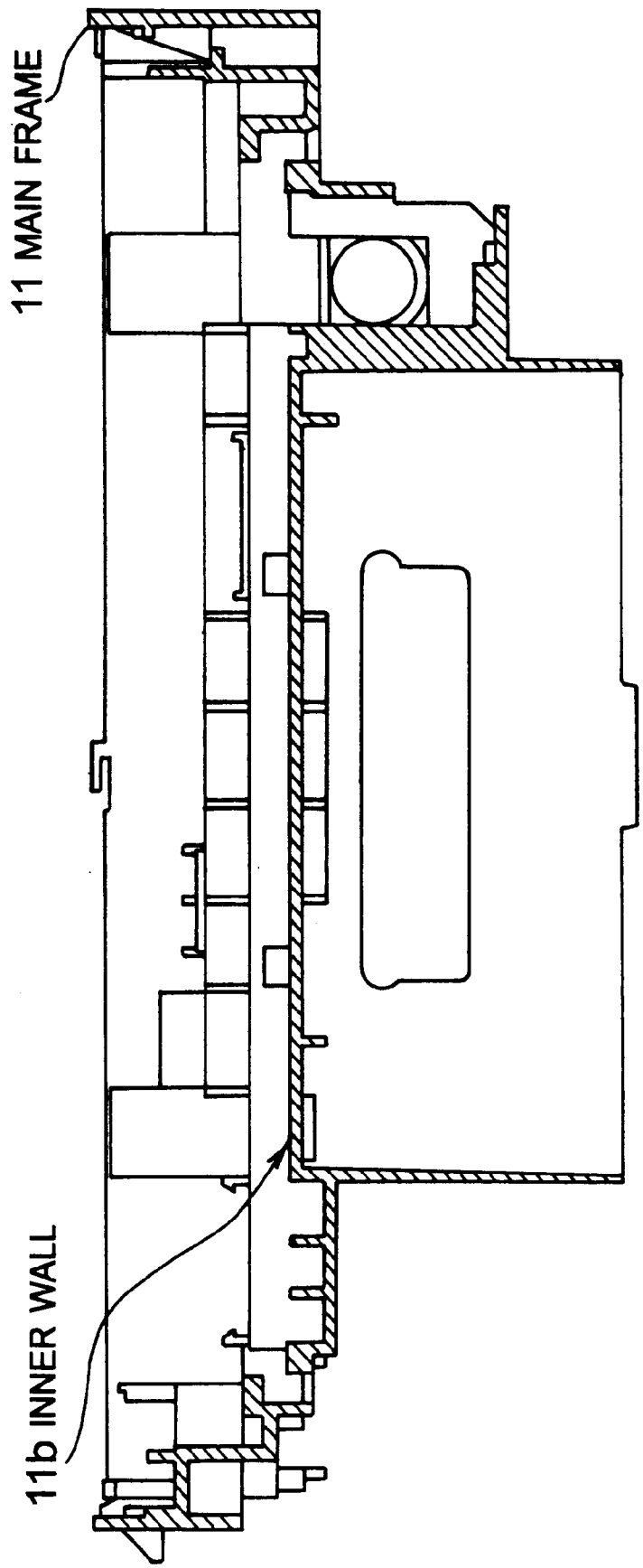
FIG. 14 shows a drawing of another cross sectional view of the main frame.

FIG. 12 shows a cross sectional view of the main frame 11 along the optical axis. And FIG. 13 shows an oblique view of the main frame 11 of which frame part 11a of left side keeping mirror 12b,12c is extracted to show inner partition 11b. Further FIG. 14 shows a cross sectional view of the main frame 11 cut at line SS—SS of FIG. 13. As shown apparently by this way, in the main frame 11, the optical axis through and from the mirror 12b,12c to the optical unit 15 and optical unit 26 is perfectly sheltered against external part without the opening part lid from which light reflected from the manuscript injects. By this way, optical external disturbance other than light from scanning position of manuscript are cut and a high quality image input is possible.

It is possible to change the resolution during one manuscript reading and input a plurality of image information of different resolution.

Figure 15:
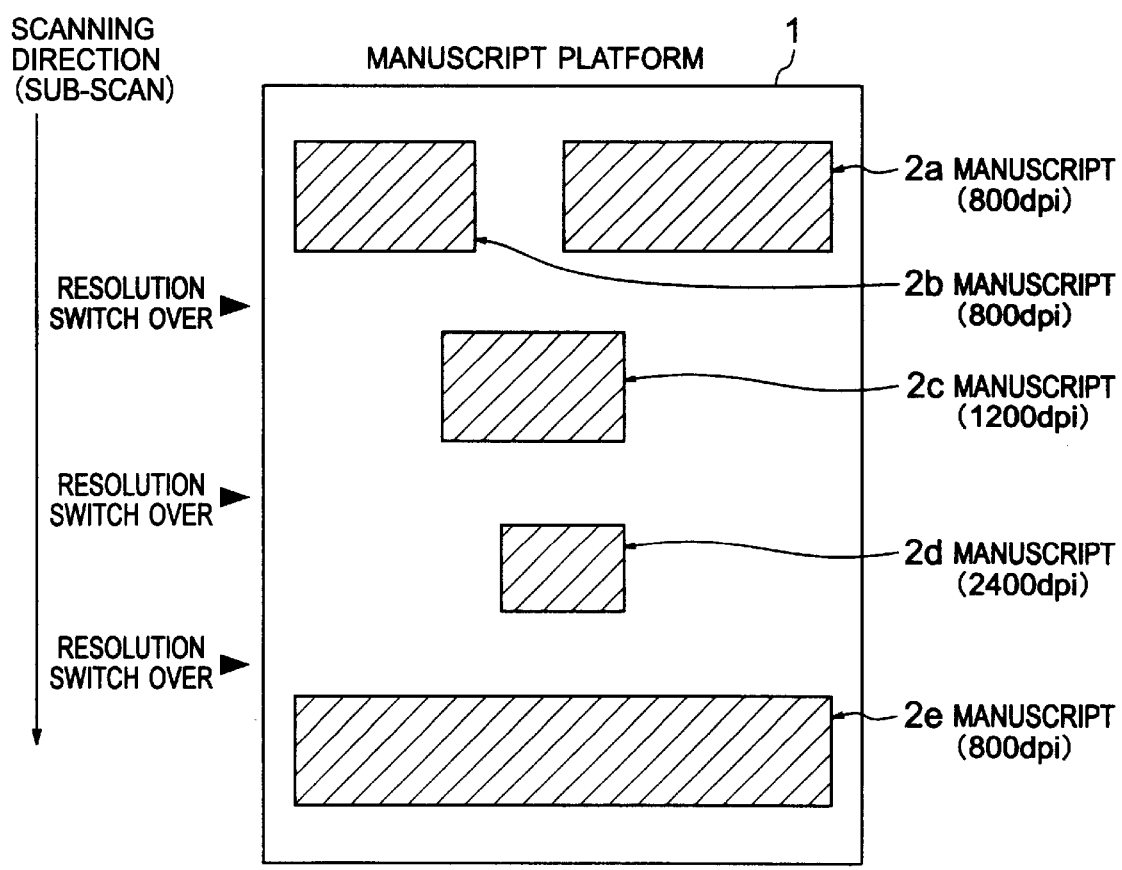
FIG. 15 shows a drawing of an embodiment of a manuscript reading way corresponding to different plural resolutions.

FIG. 15 shows an embodiment read by a plurality of different resolutions. In FIG. 15, five small size manuscripts 2a~2e are stationed on a manuscript platform station. Resolution switchover is indicated by block unit in sub-scan direction (or by setting resolution switchover point). The embodiment shown in the figure is that the manuscript of first block 2a,2b is 800 dpi the manuscript of second block 2c is 1200 dpi, the manuscript of third block 2d is 2400 dpi, the forth manuscript of 2e is 800 dpi.

Starting manuscript reading, the original reader finds whether there is an indication for the changing resolution or not at each sub-scanning position, and controls switchover of a lens corresponding to the indicated resolution by each time finding in the indication for changing the resolution, and moving the lens unit and the CCD substrate in a direction along the optical axis for regulating magnifying and focusing.

Figure 16:
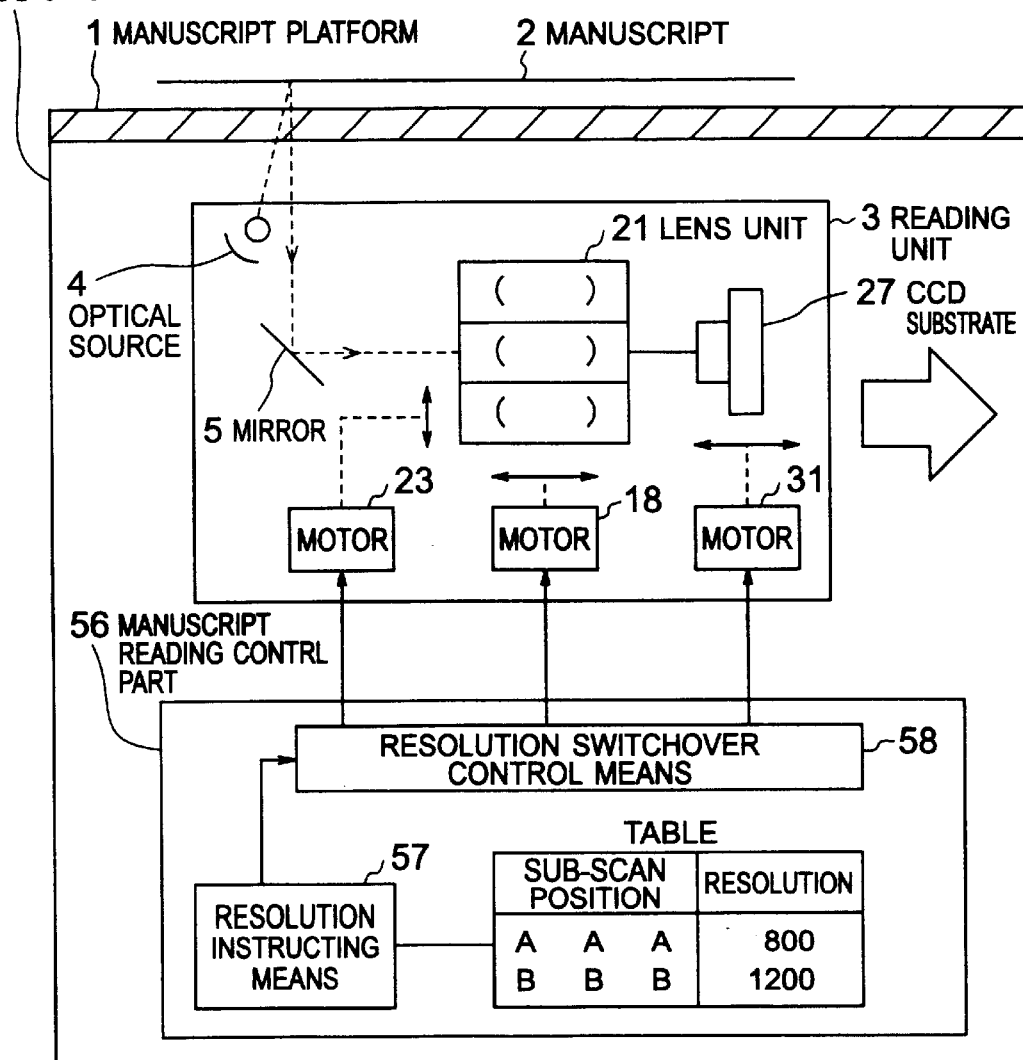
FIG. 16 shows an explanation drawing of a manuscript reading control part.
Figure 17:
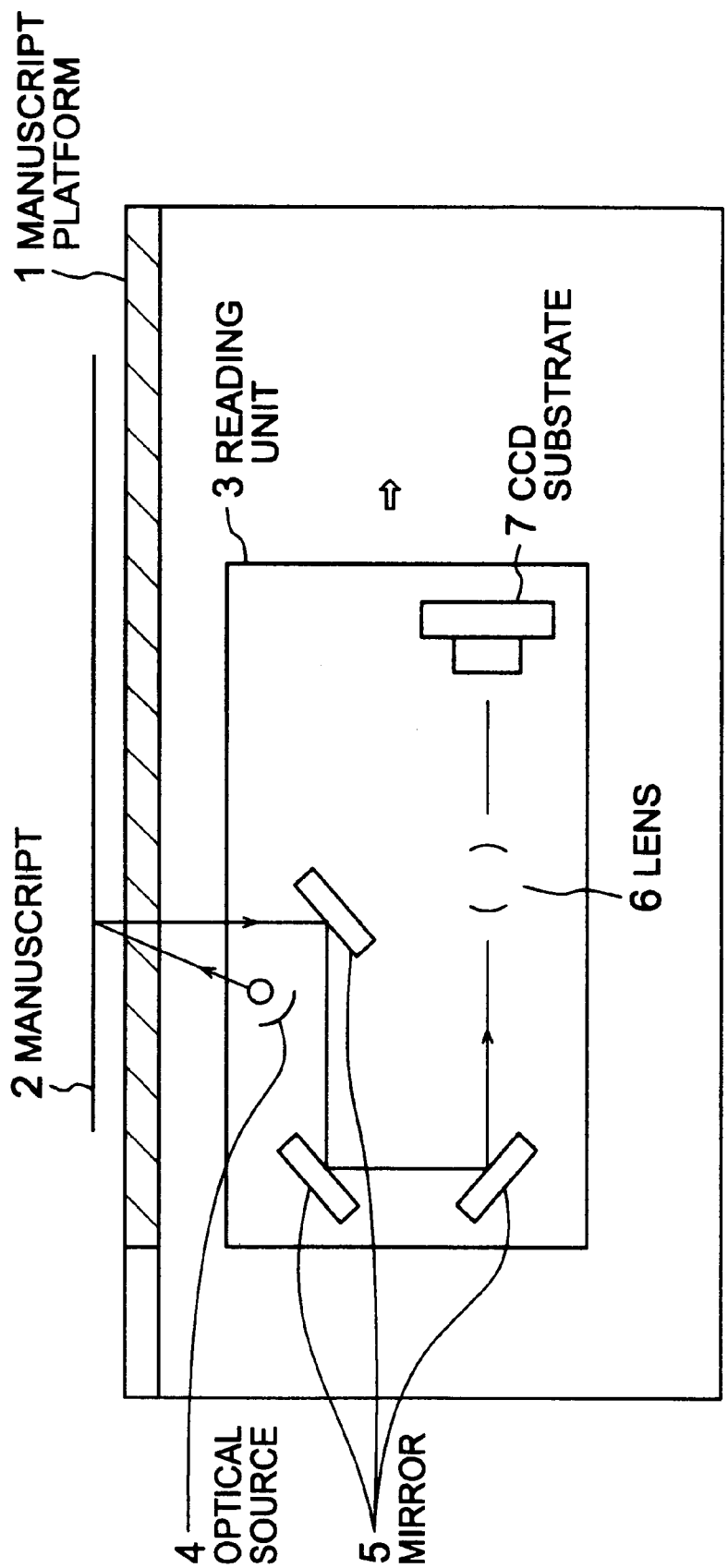
FIG. 17 shows an explanation drawing of an embodiment of a prior art original reader of flat bed type.
Figure 18A:
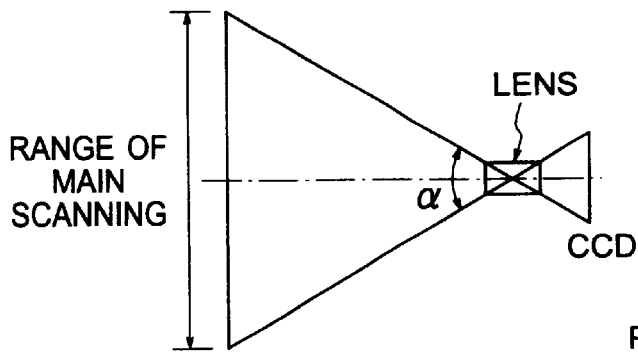
FIGS. 18(a),(b) and (c) show a prior art resolution switchover systems.
Figure 18B:
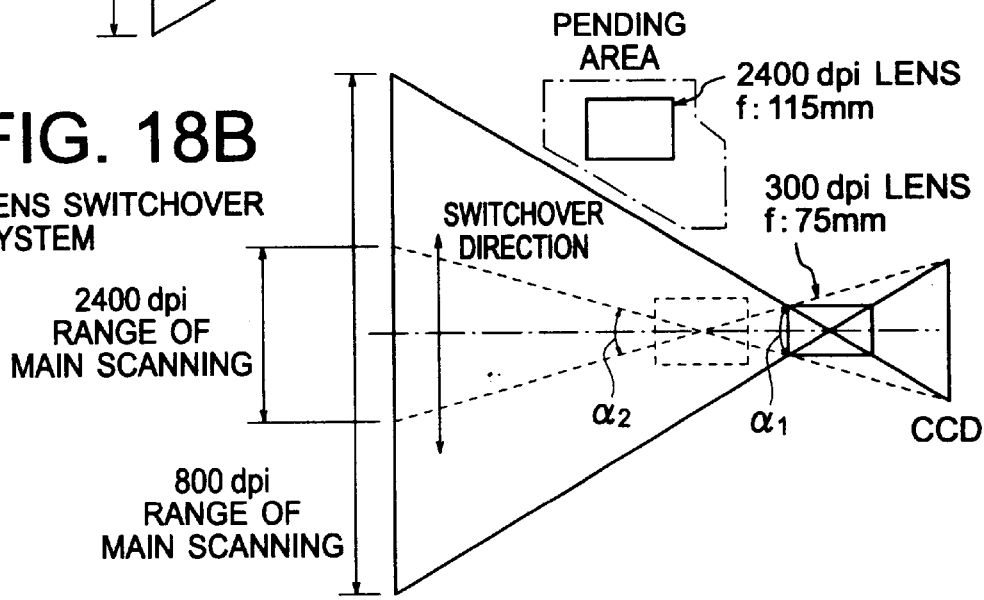
Figure 18C:
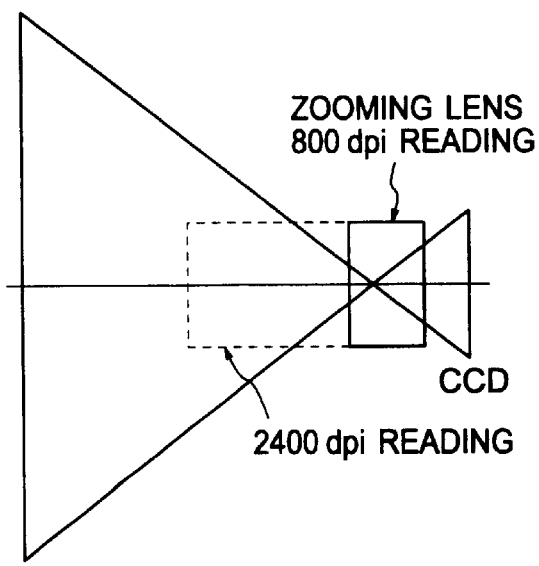

FIG. 16 shows an embodiment which may indicate the switchover of the resolution. The original reader of FIG. 16 comprises the resolution directing means 57 and the resolution switchover control means 58 in the manuscript reading control part. The resolution directing means 57 has a table which corresponds the sub-scanning position to be changed the resolution to the resolution, and indicates changing resolution to resolution switchover controlling means, when sub-scan reaches to a sub-scan position to change resolution. The resolution switchover control means 58 stops the sub-scan, drives the motor 23, insert the lens of the lens unit 21 into the path of the optical axis, and drives motor 18 and motor 31 to transfer the lens unit 21 and the CCD substrate 27 to a position adaptive for the lens to be used in a direction along the optical axis. Preview image being displayed on a screen by program for the manuscript reading control in the processing device 59, the resolution is set to the resolution directing means 57. For example, pre-scan is operated by control of any one of resolution, the pre-view image is displayed by image data obtained in the processing device 59 by the operation. On the preview image screen, a different resolution may be set on each region unit by a tool which corresponds each region to the resolution thereof in a direction to the sub-scan region. The set resolution information of region is informed to the original reader 55, and kept by the resolution directing means 57.

INDUSTRIAL APPLICABILITY

As shown by the above description, the original reader has a principle structure that changes the specified mono focus lens from plural lenses of different resolutions, and a high effective optical system lower cost than the system using zoom lens is realized. Further the present invention is each of plural lenses being united and the unit is controlled to move so that one of selected lens is transferred into the path of the optical axis, and the lens and the solid-state image sensor (CCD) substrate are regulated independently in a direction to the optical axis direction not only for regulating lens position of the optical axis in the optical path but also regulating optical path length, so both of the resolution and focusing are regulated exactly. Almost optical path to and from the manuscript are shut, therefore excessive light may be cut, and inversion of micro dust and mote are less, so the mirror and the lens plane are kept clean, and flare by external unusual light are prevented and creation of vertical line on image does not be caused, so high quality of image may be obtained. And further the evacuation space is not necessary and the device size becomes compact.

What is claimed is:

1. An original reader providing an optical source for lighting a manuscript, comprising:
   an image sensor;
   a lens unit comprising lenses focusing an image of the manuscript on the image sensor;
   a unit moving the lens unit in a sub-scanning direction along the manuscript;
   a unit moving one of the lenses on an optical path between the manuscript and the image sensor; and
   a unit moving the image sensor,
   wherein a focal length of each of the lenses is different from each other and corresponds to a resolution to read a portion of the manuscript assigned to each of the lenses, and the lens unit and the image sensor move independently from each other.

2. An original reader according to claim 1 comprising means moving for the lens unit and the solid-state image sensor substrate in a direction of the optical axis independently.

3. An original reader according to claim 1, further comprising:
   a mirror; and
   an optical source emitting a light, wherein the lens unit, the image sensor, and the mirror along the optical path are set within a frame unit, and the frame unit blocks the light from the optical source other than a light reflected from the manuscript.

4. An original reader according to claim 1, wherein the lens unit and the image sensor are attached to a guide shaft parallel to the optical path.

5. An original reader according to claim 4 further comprising:
   a unit adjusting an angle of a plane of the image sensor to the optical path.

6. An original reader according to claim 5, wherein the unit adjusting the angle of the plane of the image sensor to the optical path comprises a unit inclining and fixing the image sensor on a guide shaft.

7. An original reader according to claim 1, further comprising:
   an original reading control part, comprising a resolution directing unit directing a resolution to read the manuscript by each block area of the manuscript in a process of sub-scanning over the manuscript; and
   a resolution changing control unit changing the resolution to a directed resolution at a border of each block area.

8. An original reader according to claim 7, wherein the resolution changing control unit moves a lens corresponding to the directed resolution in the lens unit on the optical path at the boundary of the block in the process of sub-scanning and controls the lens unit and the image sensor to optimize a position of the lens unit and the image sensor on the optical path.

9. An original reader according to claim 1, wherein the lenses are integrated as a unit and optical axes of the lenses in the lens unit are parallel to each other and each lens is set so that an optical angle of one lens is not narrowed by a lens tube of an adjacent lens.

10. An original reader according to claim 9, wherein the lens unit comprises a frame having plural V grooves of cross section for mounting each lens tube.

11. An original reader according to claim 1, wherein the lenses are integrated as a unit and arranged in a direction traversal to an optical axis so that optical axes of the lenses are parallel to each other, and the focal length of each of the lenses is fixed and different from each other.

12. An original reader according to claim 11, wherein the lens unit comprises a frame having plural V groves of cross section for mounting each lens tube.

13. An original reader according to claim 11, wherein the lenses are integrated as a unit and the optical axes of the lenses in the lens unit are parallel to each other and each lens is set so that an optical angle of one lens is not narrowed by a lens tube of an adjacent lens.

14. An original reader according to claim 13, wherein the lens unit comprises a frame having plural V grooves of cross section for mounting the lens tubes.

15. An original reader according to claim 1, wherein the lens unit and the image sensor are provided in a unit.

16. An original reader according to claim 15 comprising:
an optical unit comprising the lens unit;
a first moving control unit moving the optical unit in a direction parallel to the optical axis;
a second moving control unit moving the lens unit in the optical unit in a traversal direction to the optical axis; and
a third moving control unit moving the image sensor in the optical unit in a direction parallel to the optical axis,
wherein the first moving control unit, the second moving control unit, and the third moving control unit each comprises a motor and a rack and pinion system or a belt.

17. An original reader according to the claim 16, wherein each of the optical unit, the lens unit, and the image sensor comprises a unit suppressing vibration thereon.

18. An original reader according to the claim 17, wherein the unit suppressing vibration comprises an element to press elastically a guide shaft or a guide rail moving one of the optical unit, the lens unit, and the image sensor.

19. An original reader according to the claim 18, wherein the element is attached to a frame of each unit.

20. An original reader according to claim 15, wherein the lenses are integrated as a unit and arranged in a direction traversal to an optical axis so that optical axes of the lenses are parallel to each other, and the focal length of each of the lenses is fixed and different from each other.

21. An original reader according to claim 20, wherein the lenses are integrated as a unit and the optical axes of the lenses in the lens unit are parallel to each other and each lens is set so that an optical angle of one lens is not narrowed by a lens tube of an adjacent lens.

22. An original reader according to claim 21, wherein the lens unit comprises a frame having plural V grooves of cross section for mounting the lens tubes.

23. An original reader according to claim 20, wherein the lens unit comprises a frame having plural V grooves of cross section for mounting the lens tubes.

24. An original reader according to claim 15, wherein the lenses are integrated as a unit and the optical axes of the lenses in the lens unit are parallel to each other and each lens is set so that an optical angle of one lens is not narrowed by a lens tube of an adjacent lens.

25. An original reader according to claim 24, wherein the lens unit comprises a frame having plural V grooves of cross section for mounting the lens tubes.

* * * * *